June 16, 1936.    A. LAFFON Y SOTO    2,044,188
METHOD OF MODULATING LIGHT FOR THE PHOTOELECTRIC
IMPRESSION OF SOUND ON A PHOTOSENSITIVE SURFACE
Filed March 21, 1933    2 Sheets-Sheet 1

A. Laffon y Soto
INVENTOR
By Marko + Clark
ATTYS.

Patented June 16, 1936

2,044,188

UNITED STATES PATENT OFFICE 2,044,188

METHOD OF MODULATING LIGHT FOR THE PHOTOELECTRIC IMPRESSION OF SOUND ON A PHOTOSENSITIVE SURFACE

Alberto Laffon y Soto, Madrid, Spain, assignor of one-half to Ezequiel de Selgas y Marin, Madrid, Spain Application March 21, 1933, Serial No. 661,969
In Spain March 23, 1932

6 Claims. (Cl. 179—100.3)

The present invention relates to an improved method of modulating light for the photo-electric impression of sound on a photo-sensitive surface.

The desire to obtain a method of recording sound on kinematographic film which combines the separate advantages of each of the two general methods at present employed, that of variable density and that of single or double transverse displacement, while eliminating the defects proper to each of these methods has led the inventor to study, test and carry out in practice a new method which is extremely simple and very cheap to carry out and exploit.

The invention consists in projecting a flat stationary beam of light of constant intensity on to the said photo-sensitive surface, and intercepting the said flat beam by an opaque toothed screen reciprocated in a plane at right angles to the beam in accordance with the fluctuations of an audio-frequency current, whereby the said beam will be divided by the said teeth into a plurality of equal sections separated by dark intervals adapted to produce a plurality of similar modulated impressions on the said photo-sensitive surface.

In carrying the invention into effect, the complex sinusoidal curve of a transverse record is decomposed into a certain number N of sinusoidal curves which are also complex and have the same period as the first, but have an amplitude N times smaller, the number N varying within very wide limits in order to suit the constants of the microphonic amplifier and the characteristics of the photographic emulsion to be employed.

The opaque toothed screen may be single or double in form and each element of the screen may be sub-divided into a plurality of parts, each moved by an audio-frequency current, in order to reduce the inertia of the screen.

The light passes through the transparent spaces between the teeth of the screen and the screen moves over a plane normal to the beam of light upon the impulses of the modulated current so as to vary the ratio between the lengths of the light and dark spaces and thereby modulating the beam of light which will then act upon the photo-sensitive surface.

In the absence of this modulated current, that is to say, during periods of silence the intervals of light and shade produced by the toothed screen in the beam of light are similar and as a consequence they impress on the film a series of black parallel and opaque stripes, the thickness of which is equal to that of the intermediate transparent zones; and when the electrical impulses occur each of the two edges of these black lines becomes a complex sinusoidal curve similar to that of a transverse record in which the scale of ordinates has been reduced precisely by 1; N as indicated in the drawings accompanying this specification.

In the drawings accompanying the present specification:—

Figure 1:
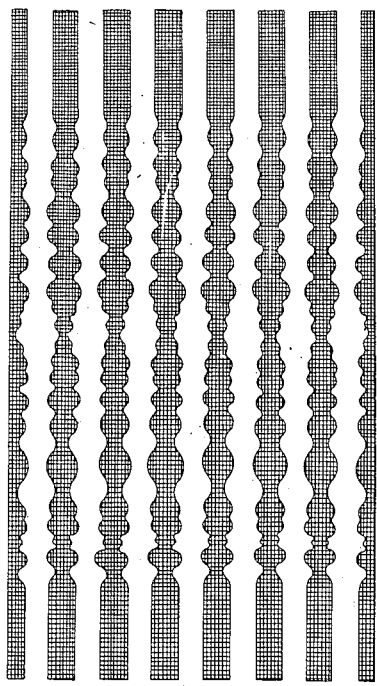
Figure 1 shows a sound record obtained by means of the present invention.

Figure 1 of the accompanying drawings clearly shows to an enlarged scale a section of a modulated band on which can be seen at the commencement and at the end of the band two zones of silence in which the intervals of light and shade are equal to each other while at the central part will be seen the multiple modulation obtained.

Figure 2:
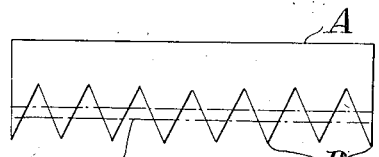
Figure 2 shows a toothed screen formed of a single member.

Figure 2 show a toothed screen formed of a plate A having a series of similar teeth B forked along one of its edges and adapted to intercept the flat stationary beam of light C.

Figure 3:
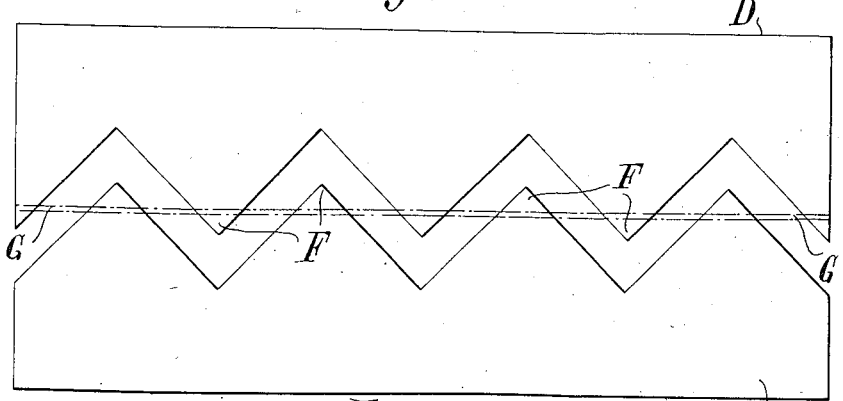
Figure 3 shows a toothed screen formed of two co-operating parts.
Figure 4:
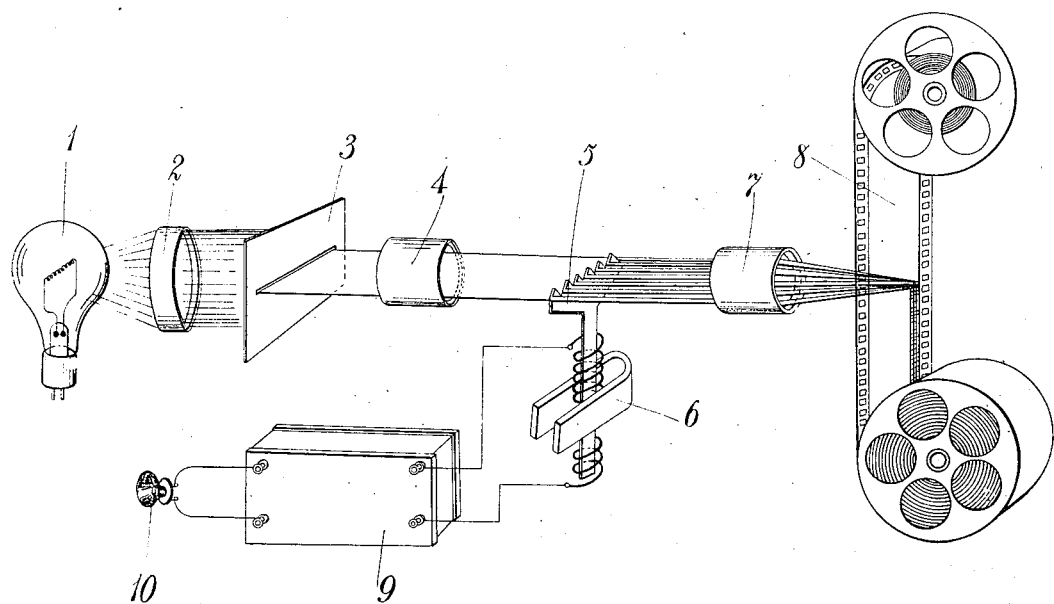
Figure 4 shows a diagrammatic arrangement of suitable apparatus for carrying the invention into effect.

Figure 3 shows another form of screen composed of two co-operating parts D and E having adjacent edges with interengaging teeth F formed along these edges so as to intercept the flat beam of light G as shown.

With regard to the apparatus employed for producing the oscillations of the screen it has been found that the best results have been obtained by connecting it rigidly to the moving coil of a motor of the type currently employed in loud speakers called electro-dynamic, that is to say, by connecting the screen rigidly to an electric conductor traversed by the audio-frequency modulated current and situated in a powerful electro-magnetic field.

An example of apparatus for carrying the invention into effect, is illustrated in Figure 3. In this apparatus the light of constant intensity issuing from a lamp 1 passes through a condenser 2, and is then converted into a flat stationary beam by passing through a slot in plate 3. The image of this slot is projected upon the teeth of an opaque toothed screen 5 by means of an objective 4, and an objective 7 projects a reduced image of the flat beam cut by the teeth of the screen 5 onto the film 8.

The movements of the toothed screen are produced by means of an audio-frequency electric motor 6, connected through a microphonic compensating amplifier 9 to the microphone 10.

The invention is capable of a multitude of very interesting scientific applications such as the photo-electric gramophone, recording oscillographs for the analysis of sound, and others in which the impression is not made on kinematographic film but on any emulsion sensitive to light whether this support is celluloid, glass, paper or other suitable material.

Among the numerous advantages offered by this new method the following may be mentioned:

1. The sound negative may be impressed upon positive film of existing commercial type which is very cheap.

2. A complete suppression of the complication involved in the photographic method by the variable density systems for obtaining very critical values of the range both on the negative and on the positive as this method lacks half tones or grey tones.

3. In view of the small amplitude of movement of the toothed screen and the small mass of this screen, this movement may be produced at the highest acoustic frequencies with an extremely small power of the modulated electric current.

4. The lack of uniformity in the illumination of the curve both during impression and during reproduction produces no distortion of the sound, nor is any such distortion produced by any lack of accuracy in centering the band, the width of which may be a little greater than the length of the projecting slot as in the variable density mode of impression.

5. The toothed screen oscillograph forming the essential basis of the new method according to the present invention may be employed in the greater part of existing sound recording apparatus.

6. Numerous causes of distortion inherent to the methods hitherto known are eliminated.

What I claim is:

1. A method of modulating light for the photo-electric impression of sound on a photo-sensitive surface such as kinematographic film consisting in projecting a flat stationary beam of light of constant intensity on to the said photo-sensitive surface and intercepting the said flat beam by an opaque toothed screen reciprocated in a plane at right angles to the beam by connection to an electric conductor traversed by an audio-frequency current and situated in a magnetic field.

2. A method of modulating light for the photo-electric impression of sound on a photo-sensitive surface such as kinematographic film, consisting in converting the light issuing from a source of constant intensity into a stationary flat beam by passage through a slot, projecting the said flat beam upon the photo-sensitive surface and modulating this flat beam by the teeth of an opaque toothed screen reciprocated in a plane at right angles to the beam by connection to an electric conductor traversed by an audio-frequency current and situated in a magnetic field.

3. A method as claimed in claim 1, wherein the toothed screen is rigidly connected to the freely movable electric conductor of a loud speaker.

4. A method of modulating light for the photo-electric impression of sound on a photo-sensitive surface, such as kinematographic film, as claimed in claim 2, wherein the screen is composed of a plurality of parts.

5. A method of modulating light for the photo-electric impression of sound on a photo-sensitive surface, such as kinematographic film, as claimed in claim 2, wherein the screen is composed of two co-operating plates having adjacent edges with interengaging teeth formed along these edges.

6. A method of modulating light for the photo-electric impression of sound on a photo-sensitive surface, such as kinematographic film, as claimed in claim 2, wherein the screen is formed of a single plate having a series of similar teeth formed along one edge.

ALBERTO LAFFON Y SOTO.